United States Patent
Davey et al.

(10) Patent No.: US 6,195,986 B1
(45) Date of Patent: Mar. 6, 2001

(54) METHOD AND SYSTEM FOR MONITORING A CATALYTIC CONVERTER

(75) Inventors: Christopher Kirk Davey, Novi; David Robert Nader, Farmington Hills; Michael Igor Kluzner, Oak Park; Robert Joseph Jerger, Dexter, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/337,389

(22) Filed: Jun. 21, 1999

(51) Int. Cl.$^7$ ....................................................... F01N 3/00
(52) U.S. Cl. .............................. 60/274; 60/277; 60/285; 701/102
(58) Field of Search ............................ 60/277, 274, 285; 701/102, 115

(56) References Cited

U.S. PATENT DOCUMENTS

| | | | |
|---|---|---|---|
| 5,301,501 | * | 4/1994 | Shimizu et al. ........................ 60/274 |
| 5,357,751 | | 10/1994 | Orzel . | 
| 5,653,102 | * | 3/1998 | Ozel et al. .............................. 60/274 |
| 5,724,809 | * | 3/1998 | Mitsutani ............................... 60/276 |
| 5,875,628 | * | 3/1998 | Mitsutani ............................... 60/276 |
| 5,887,421 | * | 3/1999 | Mitsutani ............................... 60/274 |

* cited by examiner

*Primary Examiner*—Thomas Denion
*Assistant Examiner*—Thai-Ba Trieu
(74) *Attorney, Agent, or Firm*—Allan J. Lippa

(57) ABSTRACT

A method of detecting catalytic converter deterioration based on the ratio of the arc length or the number of transitions of signals from sensors upstream and downstream of the converter where ratio determination is restricted to predefined air mass ranges within corresponding predefined engine speed/load ranges in order to avoid areas of engine speed and load instability that might impair test to test repeatability of the deterioration detection.

8 Claims, 2 Drawing Sheets

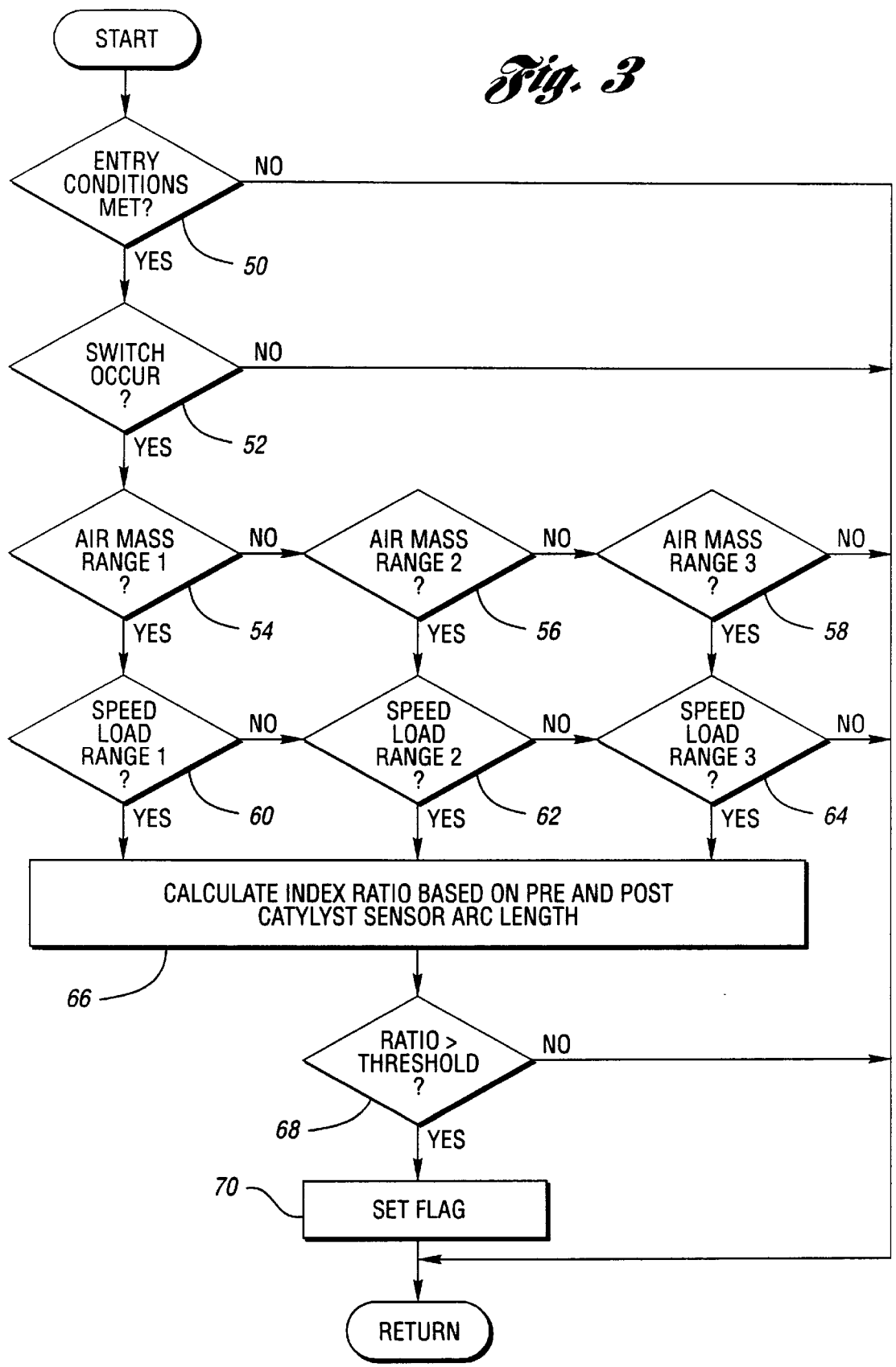

METHOD AND SYSTEM FOR MONITORING A CATALYTIC CONVERTER

TECHNICAL FIELD

The present invention relates to a method and system for determining the efficiency of a catalytic converter based on signals generated by pre-catalyst and post-catalyst exhaust gas oxygen sensors.

BACKGROUND ART

Increasingly stringent federal regulations limit the permissible levels for emissions. As such, vehicle manufacturers have developed various methods to reduce emissions while improving vehicle performance and fuel economy. Catalytic converters, positioned in the engine exhaust path, are often used to reduce emission levels of regulated exhaust gases. The conversion efficiency of a catalytic converter may be monitored using a pre-catalyst $O_2$ sensor positioned upstream from the catalytic converter and a post-catalyst $O_2$ sensor positioned downstream from the catalytic converter.

One method known for indicating conversion efficiency of the catalyst is to calculate a ratio of downstream sensor transitions or switches to upstream sensor transitions or switches. An increasing switch ratio is generally indicative of a degrading catalyst. When the switch ratio exceeds a threshold value, a malfunction indicator light (MIL) is illuminated so the vehicle operator will seek service. This method of catalyst monitoring is disclosed in Orzel 5,357,751, assigned to the assignee of the present invention, and is referred to as the Switch Ratio (SR) method. Another method for indicating conversion efficiency of the catalyst is based on the ratio of the arc lengths of the downstream sensor signal to the arc lengths of the upstream sensor signals identified as an Index Ratio (IR) method in contrast to the SR method. This method is disclosed in U.S. patent application Ser. No. 08/785,406, filed Jan. 22, 1997, assigned to the assignee of the present invention, and incorporated herein by reference.

The test cycle for catalyst monitoring requires collection of data from each of the sensors while the engine is operating in each of a plurality of inducted airflow ranges or air mass (AM) cells. In each method a predetermined number of transitions or switches of the upstream sensor in each AM cell is required to complete the test cycle. These methods rely on AM cell calibration and assume that sensor signal transitions occurring in a defined AM cell are valid for ratio computation regardless of engine speed and load conditions. The determination of SR and IR based on data taken while the driver is operating the vehicle at a high load, low rpm or low load, high rpm condition results in increased SR and IR variability even though operation is within one of the plurality of inducted airflow ranges. The determination of catalyst conversion efficiency based solely on AM conditions may result in error, and may reduce the ability to discriminate between a good and a failed catalyst.

DISCLOSURE OF THE INVENTION

It is a general object of the present invention to reduce variability between catalyst monitor tests that use the switch ratio or index ratio metric.

In carrying out the above object and other objects, features and advantages of the present invention, a method for monitoring emissions of an internal combustion engine is provided that further refines the engine operating conditions under which data is collected from the front and rear sensors. More specifically, data collected only at predefined inducted air mass and engine speed and load conditions is used in determining catalyst deterioration in order to avoid areas of engine speed and load instability that might impair test to test repeatability of the monitor output.

The above object and other objects, features, and advantages of the present invention will be readily apparent from the following detailed description of the best mode for carrying out the invention when taken in connection with the accompanying drawings.

BRIEF DESCRIPTION OF THE DRAWINGS

FIG. 3 is a flow diagram illustrating operation of a method and system for monitoring the catalytic converter efficiency according to the present invention.

BEST MODE FOR CARRYING OUT THE PREFERRED EMBODIMENT

Figure 1:
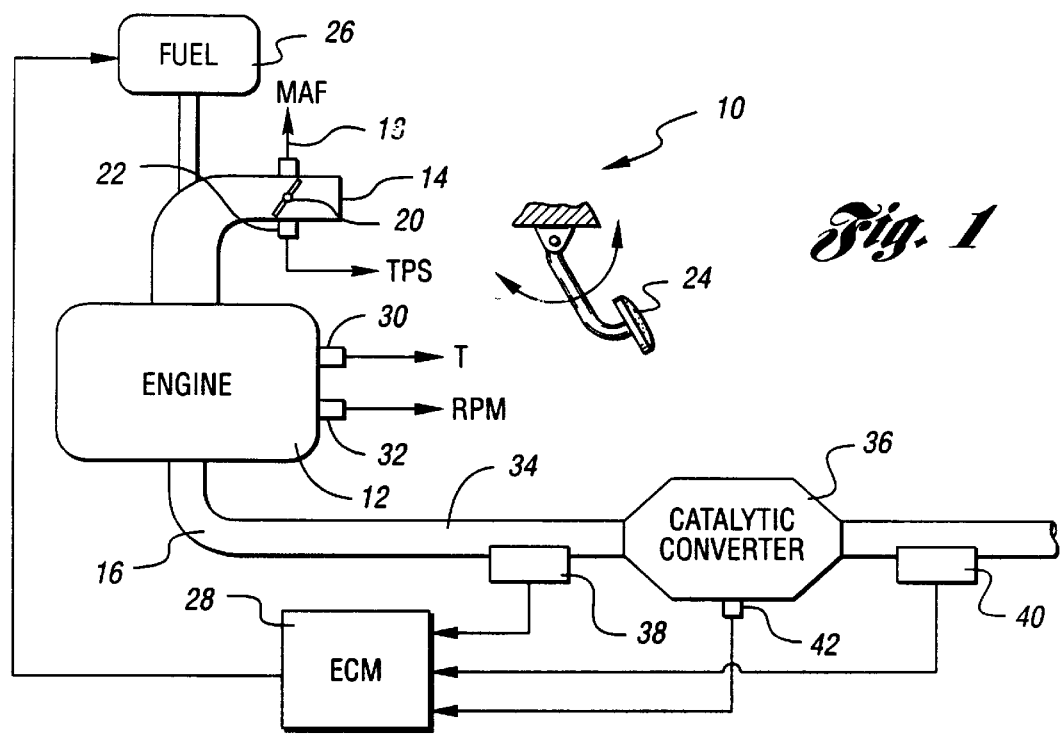
FIG. 1 is a block diagram of a system for monitoring a catalytic converter according to the present invention.

Referring now to FIG. 1, a block diagram illustrating a system for monitoring performance or conversion efficiency of a catalytic converter is shown. System 10 includes an internal combustion engine 12 having an intake manifold 14 and exhaust manifold 16. Airflow through intake manifold 14 is measured by mass air flow (MAF) sensor 18 and regulated by throttle valve 20. A throttle position sensor 22 provides a signal (TPS) indicative of position of throttle valve 20 or an associated accelerator pedal 24. A conventional fuel supply 26 provides fuel which is mixed with the air in intake manifold 14 to provide a combustion mixture which is controlled by an engine controller, such as Engine Control Module (ECM) 28. An engine coolant temperature sensor 30, and an engine speed (RPM) sensor 32 communicates engine temperature and engine speed information respectively to the ECM 28. ECM 28 may also perform control and monitoring functions for various vehicle systems and subsystems in addition to controlling and monitoring engine 12.

An exhaust pipe 34 couples a catalytic converter 36, preferably a three-way converter (TWC) to the exhaust stream of engine 12. Catalytic converter 36 is monitored via an upstream (front) exhaust gas sensor 38 and a downstream (rear) exhaust gas sensor 40 each in communication with the engine controller 28. Upstream sensor 38 is located between engine 12 and catalytic converter 36 whereas downstream sensor 40 is located between catalytic converter 36 and the atmosphere. Upstream sensor 38 is preferably an exhaust gas oxygen sensor, commonly referred to as a HEGO sensor, which provides an indication of presence or absence of oxygen in the exhaust stream. Downstream sensor 40 operates in a similar fashion as upstream sensor 38 but is commonly referred to as a catalyst monitor sensor (CMS) due to its intended function in the exhaust system. Any of a number of exhaust gas sensors may be utilized including lambda sensors, proportional oxygen sensors, and the like, to determine conversion efficiency of the converter according to the present invention. A catalytic converter temperature sensor 42 provides data to the ECM 28 regarding converter temperature. Alternatively, the converter temperature may be inferred, from other sensor data in order to avoid the cost of an additional dedicated temperature sensor. Various other sensors communicate with ECM 28 to facilitate control and monitoring functions. These sensors may include an EGR sensor or other device for exhaust gas recirculation monitoring.

ECM 28 includes a microprocessor and vario computer readable storage media, which may include but is not limited to a read only memory (ROM), a random access memory (RAM), and a keep-alive memory (KAM). The computer readable storage media may be implemented by any of a number of known volatile and nonvolatile storage devices including but not limited to PROM, EPROM, EEPROM, flash memory, and the like, all of which are well known in the art. RAM is typically used for temporary data storage of various operating variables which are lost when the engine ignition is turned off, such as counters, timers, status flags, and the like. KAM is generally used to store learned or adaptive values which may change over time. The contents of KAM are maintained as long as some power is provided to ECM 28. Preferably, one or more ROMs within ECM 28 contains control logic implemented by program instructions executed by the microprocessor along with various system parameter values and calibrations.

ECM 28 receives signals from upstream and downstream exhaust gas sensors 38 and 40, respectively, which reflect current operating conditions of engine 12 and converter 36. For example, when at or above operating temperature, upstream sensor 38 provides a continuous signal (preferably a voltage) to ECM 28 based on the presence or absence of oxygen in exhaust pipe 34. The voltage signal is indicative of the excursion from the stoichiometric combustion mixture of the exhaust gases in exhaust manifold 16. The upstream sensor signal is a two-state signal having a predetermined high voltage when exhaust gases indicate a rich mixture and a predetermined low voltage when exhaust gases indicate a lean mixture. Downstream sensor 40 monitors catalytic converter 36 by detecting the presence or absence of oxygen downstream from converter 36 and provides a voltage signal to ECM 28.

ECM 28 uses control logic implemented in hardware and/or software to generate various signals to control and monitor operation of engine 12. For example, controller 28 generates an output signal to electronic fuel injectors, represented by fuel supply 24, to control the quantity and timing of fuel delivered to engine 12 in response to a feedback variable derived from an output of the upstream sensor 38.

In the present invention, the ECM 28 is also used to monitor performance of catalytic converter 36 using the signals from upstream sensor 38 and downstream sensor 40. The sensor signals are filtered, periodically sampled, and stored within ECM 28 to monitor performance of catalytic converter 36. The amplitude variation or excursion of the signal of the downstream sensor 40 is much less than that of the signal from the upstream sensor 38 due to the operation of the catalytic converter in converting the exhaust gases. As such, catalyst monitors that rely on amplitude variation of the downstream sensor signal are less sensitive to variations induced by catalyst degradation. In contrast, the index ratio metric is based on the arc-length of the signal and the incorporation of a time-based or horizontal component of the sensor signal produces superior sensitivity as explained in the aforementioned U.S. patent application Ser. No. 08/785,406.

Figure 2:
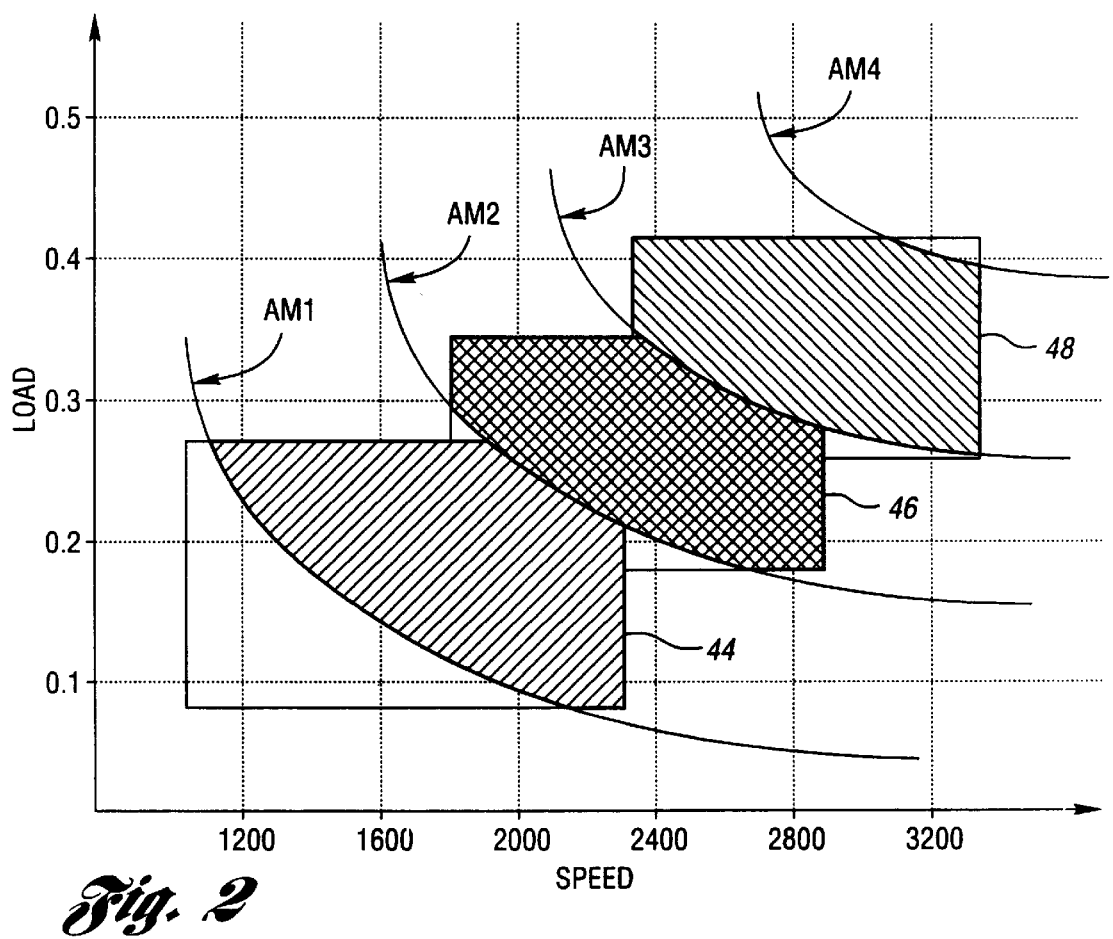
FIG. 2 graphically illustrates the speed load ranges and inducted air mass ranges where index ratio computation is valid according to the present invention.

Referring now to the graph of FIG. 2, AM1, AM2, AM3, and AM4 designate lines of equal air mass, while calibratable speed/load ranges are designated 44–48. The objective of the speed/load ranges for the respective AM cells is to optimize calibration by applying predetermined speed/load conditions during real world driving. This permits the real world SR or IR to be very closely correlated with a reference threshold ratio obtained during vehicle testing thereby significantly reduces monitor variability in the field. In performing the monitoring test cycle, the data used to determine catalyst deterioration is limited to overlapping air mass and speed/load conditions indicated by the three cross-hatched areas in FIG. 2 where lines of equal air mass overlap corresponding speed/load ranges. In other words, signal from the sensor 38 and 40 are only considered for ratio determination, whether SR or IR, unless the inducted air mass is between AM1–AM2 and engine speed and load are within the range indicated by block 44, or between AM2–AM3 and block 46, or between AM3–AM4 and block 48. It will, of course, be understood that the invention is not limited to any particular number of air mass window cells and speed/load ranges.

The inducted air mass is determined from sampling the MAF sensor 18. Engine speed is obtained from the sensor 32 and load may be inferred from the data obtained from sensor 18 with respect to engine speed and throttle position obtained from the sensors 32 and 22, respectively. Various other methods, well known in the art, may be used to determine engine load. For example, load may be calculated in accordance with SAE Standard J1979 that defines a "calculated load value" as an indication of the current airflow divided by the peak airflow, where peak airflow is corrected for altitude, if available. Mass airflow and barometric pressure sensors are not required for this calculation. This definition provides a unitless number that is not engine specific, and provides an indication of the percent engine capacity that is being used (with wide open throttle as 100%).

Referring now to FIG. 3, flow diagrams generally illustrating operation of a system or method according to the present invention is shown. As will be appreciated by one of ordinary skill in the art, the flow diagrams represent control logic which may be implemented in hardware, software, or a combination of hardware and software. Preferably, the control logic is stored in a computer-readable medium, such as a PROM, EPROM, EEPROM, or flash memory, and represents program instructions which may be executed by a microprocessor. Of course, other implementations of the control logic using discrete components and/or custom integrated circuits, such as ASICs, are possible without departing from the spirit or scope of the present invention. One of ordinary skill in the art will also recognize that the particular order or sequence illustrated is not necessarily required to achieve the goals and objects of the present invention. FIG. 3 shows sequential operation of a system or method for ease of illustration and description only. As such, various programming and processing strategies may be used, such as interrupt-driven processing, parallel processing, or the like, depending upon the particular implementation.

With reference to FIG. 3, block 50 determines whether global and local entry conditions have been satisfied to enable catalyst monitoring in order to monitor the catalyst over time under similar operating conditions. Global entry conditions may include vehicle speed, engine temperature, ambient temperature, catalyst temperature, and downstream sensor temperature. Local entry conditions may include certain transient conditions, and EGR.

After global and local entry conditions are satisfied, switches or transitions of the upstream $O_2$ sensor is monitored as indicated by block 52. If a transition occurs, a determination is made in blocks 54–58 whether it occurred in predefined AM ranges AM1–AM2, AM2–AM3, or AM3–AM4. If so, and depending upon which range, a determination is made in blocks 60–64 whether the engine is operating in the predetermined speed/load ranges that are valid for transitions occurring in the corresponding AM range. While engine operation remains within the inducted air mass and speed and load ranges indicated by the cross-hatching in FIG. 2, a test period is generated which includes operation within each of these ranges for at least a minimum duration based on a predetermined number of required transition of the upstream sensor signal in each range.

At block 66, the index ratio is calculated. This calculation is performed after a predetermined number of front sensor switches have occurred in each of the designated AM ranges within the corresponding speed/load ranges shown in FIG. 2. After the ratio is calculated, counters used to keep track of the number of transitions are reset. Preferably, as discussed more fully in the aforementioned patent application, the index ration is based on the arc length of the signals from the downstream and upstream sensors according to:

$$R = \frac{\sum \sqrt{(S1_{i+1} - S1_i)^2 + (t_{i+1} - t_i)^2}}{\sum \sqrt{(S2_{i+1} - S2_i)^2 + (t_{i+1} - t_i)^2}} \quad (1)$$

where R represents the ratio, S1 represents the downstream sensor signal, S2 represents the upstream sensor signal, t represents time, and i represents a sample number.

The index ratio calculated in block 66 is compared with a threshold ratio value at block 68. If the threshold is exceeded a flag is set as indicated at block 70 to indicate that converter efficiency has degraded below a preselected limit. An increasing index ratio is generally indicative of a degrading catalyst. Preferably, when the flag is set, a malfunction indicator light (MIL) is illuminated so the vehicle operator will seek service. As such, it is important to properly set the threshold value to reduce unnecessary or premature service indications while eliminating the possibility of an unacceptable catalyst being undetected.

Alternatively, during this test period the switch ratio SR may be determined in block 66 and compared with a threshold SR. The SR is determined by counting the number of rear signal transitions occurring during the test period and dividing this number by the maximum number of front signal transitions, as more fully explained in the aforementioned Orzel patent, to obtain a ratio. If the calculated ratio is greater than a preselected reference ratio a flag is set indicating that converter efficiency has degraded below a preselected limit.

While the best mode for carrying out the invention has been described in detail, those familiar with the art to which this invention relates will recognize various alternative designs and embodiments for practicing the invention as defined by the following claims.

What is claimed is:

1. A method for indicating efficiency of a catalytic converter positioned in the engine exhaust based on processing the signals from upstream and downstream exhaust gas sensors located respectively upstream and downstream of said converter, said method comprising the steps of:

processing signals from said upstream and downstream sensors during normal engine operation to determine corresponding upstream and downstream signal arc lengths;

determining when the engine has completed operation within each of a plurality of predetermined inducted airflow ranges and concurrently in a corresponding plurality of predetermined engine speed and load ranges for at least a minimum duration; and indicating degraded converter efficiency based on the ratio of said upstream and downstream signal arc lengths determined during said plurality of ranges.

2. The method recited in claim 1 wherein said ratio generated in said indicating step is compared to a preselected ratio to provide an indication of converter deterioration.

3. A method for indicating efficiency of a catalytic converter positioned in the engine exhaust based on processing the signals from upstream and downstream exhaust gas sensors located respectively upstream and downstream of said converter, said method comprising the steps of:

providing a converter test cycle by determining when the engine has completed operation within each of a plurality of predetermined inducted airflow ranges and concurrently in a corresponding plurality of predetermined engine speed and load ranges for at least a minimum duration;

generating respective minimum durations by determining when a preselected number of transitions from a first state to a second state has occurred in said upstream sensor while the engine is operating in respective airflow and engine speed and load ranges; and processing signals from said upstream and downstream sensors to determine whether converter efficiency has degraded.

4. The method defined in claim 3 wherein signals from said upstream and downstream sensors are processed to determine corresponding upstream and downstream signal arc lengths; and determination of converter efficiency is based on the ratio of said upstream and downstream signal arc lengths.

5. The method defined in claim 3 wherein signals from said upstream and downstream sensors are processed to determine the number of upstream and downstream signal transitions occurring during said test cycle; and determination of converter efficiency is based on the ratio of the number of said upstream and downstream transitions.

6. A system for indicating efficiency of a catalytic converter positioned in the engine exhaust based on processing the signals from upstream and downstream exhaust gas sensors located respectively upstream and downstream of said converter, said system comprising:

means for processing signals from said upstream and downstream sensors during normal engine operation to determine corresponding upstream and downstream signal arc lengths;

means for determining when the engine has completed operation within each of a plurality of predetermined inducted airflow ranges and concurrently in a corresponding plurality of predetermined engine speed and load ranges for at least a minimum duration; and means for indicating degraded converter efficiency based on the ratio of said upstream and downstream signal arc lengths determined during engine operation within said plurality of ranges.

7. A computer readable storage medium for use with an engine controller for monitoring performance of a catalytic converter located in the exhaust produced by an engine, the computer readable medium comprising:

control logic for sampling first and second signals generated by corresponding first and second exhaust gas sensors located respectively upstream and downstream of said converter;

said logic including means for determining corresponding arc lengths for the first and second signals while said engine is operating in a plurality of predetermined inducted airflow ranges and corresponding predetermined engine speed and load ranges for a minimum duration in each range;

said logic further including means for monitoring the performance of the catalytic converter based on the arc lengths of the first and second signals.

8. The computer readable storage medium of claim 7 further comprising:

control logic for determining an arc length ratio by dividing the arc length corresponding to the second signal by the arc length corresponding to the first signal.

* * * * *